United States Patent
Han et al.

(10) Patent No.: US 10,711,130 B2
(45) Date of Patent: Jul. 14, 2020

(54) METHOD OF PREPARING ABS-BASED GRAFT COPOLYMER HAVING IMPROVED IMPACT STRENGTH AND METHOD OF MANUFACTURING ABS-BASED INJECTION-MOLDED ARTICLE INCLUDING THE SAME

(71) Applicant: LG CHEM, LTD., Seoul (KR)

(72) Inventors: Su Jeong Han, Daejeon (KR); Young Min Kim, Daejeon (KR); Jin Hyoung Lee, Daejeon (KR); Yoo Vin Kim, Daejeon (KR); Young Hwan Jeong, Daejeon (KR); Sun Haeng Chung, Daejeon (KR); Jae Min Suk, Daejeon (KR); Jae Won Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 159 days.

(21) Appl. No.: 16/070,153

(22) PCT Filed: Sep. 26, 2017

(86) PCT No.: PCT/KR2017/010647
§ 371 (c)(1),
(2) Date: Jul. 13, 2018

(87) PCT Pub. No.: WO2018/084436
PCT Pub. Date: May 11, 2018

(65) Prior Publication Data
US 2019/0023894 A1    Jan. 24, 2019

(30) Foreign Application Priority Data
Nov. 1, 2016    (KR) .......................... 10-2016-0144438

(51) Int. Cl.
| | | |
|---|---|---|
| *C08L 55/02* | (2006.01) | |
| *C08F 279/04* | (2006.01) | |
| *C08K 5/42* | (2006.01) | |
| *C08F 2/24* | (2006.01) | |
| *C08F 4/40* | (2006.01) | |
| *C08K 5/092* | (2006.01) | |
| *B29C 45/00* | (2006.01) | |
| *C08K 5/098* | (2006.01) | |
| *C08F 2/34* | (2006.01) | |
| *C08K 5/372* | (2006.01) | |

(52) U.S. Cl.
CPC .............. *C08L 55/02* (2013.01); *B29C 45/00* (2013.01); *C08F 2/24* (2013.01); *C08F 2/34* (2013.01); *C08F 4/40* (2013.01); *C08F 279/04* (2013.01); *C08K 5/092* (2013.01); *C08K 5/098* (2013.01); *C08K 5/372* (2013.01); *C08K 5/42* (2013.01); *C08F 2500/01* (2013.01); *C08F 2800/20* (2013.01)

(58) Field of Classification Search
CPC .............. C08L 55/02; C08F 2/24; C08F 4/40
See application file for complete search history.

(56) References Cited

U.S. PATENT DOCUMENTS

| | | | | | |
|---|---|---|---|---|---|
| 2,876,203 | A | * | 3/1959 | Miller ..................... | C08F 36/04 524/774 |
| 5,360,865 | A | * | 11/1994 | Aoyama ................. | C08L 51/04 525/307 |
| 2003/0114580 | A1 | * | 6/2003 | Kim ....................... | C08F 279/02 524/534 |

FOREIGN PATENT DOCUMENTS

| | | | | |
|---|---|---|---|---|
| CN | 1416433 | A | 5/2003 | |
| CN | 1034750399 | * | 12/2013 | |
| CN | 105008406 | A | 10/2015 | |
| CN | 105189588 | A | 12/2015 | |
| EP | 0714943 | A2 | 6/1996 | |
| EP | 0714949 | A2 | * 6/1996 | .............. C08L 51/04 |
| EP | 0714949 | A2 | 6/1996 | |
| EP | 3363833 | A1 | 8/2018 | |
| EP | 3381957 | A1 | 10/2018 | |
| KR | 10-0179314 | B1 | 5/1999 | |
| KR | 10-0755592 | B1 | 9/2007 | |
| KR | 2011-0058540 | | * 6/2011 | |
| KR | 2012-0140534 | | * 12/2012 | |
| KR | 10-2016-0071250 | A | 6/2016 | |
| KR | 10-2016-0073005 | A | 6/2016 | |
| KR | 10-2016-0077627 | A | 7/2016 | |
| WO | 2014208965 | A1 | 12/2014 | |
| WO | WO2016093616 | A1 | 6/2016 | |
| WO | WO2016093649 | A1 | 6/2016 | |
| WO | WO2016099129 | A1 | 6/2016 | |

OTHER PUBLICATIONS

Translation of KR 2012-0140534 (Year: 2012).*
Translation of CN 1034750399 (Year: 2013).*
Translation of KR 2011-0058540 (Year: 2011).*
Office Action dated Jan. 22, 2020 for Chinese Application 201780005147.1.
International Search Report for PCT/KR2017/010647 filed on Sep. 26, 2017.
European Patent Office Search Report for Application No. 17866943. 8, dated Mar. 15, 2019.

* cited by examiner

*Primary Examiner* — Robert C Boyle

(57) ABSTRACT

The present invention relates to a method of preparing an ABS-based graft copolymer having improved impact strength and an ABS-based injection-molded article including the same. More particularly, the present invention provides an ABS-based copolymer resin having improved impact strength by optimizing structures of large-diameter diene-based rubber latex particles and a matrix structure between ABS-based copolymer particles and a SAN resin through introduction of a multimeric acid of an unsaturated fatty acid or a metal salt thereof as an emulsifier in a large-diameter diene-based rubber latex polymerization step and an ABS graft polymerization step.

14 Claims, No Drawings

METHOD OF PREPARING ABS-BASED GRAFT COPOLYMER HAVING IMPROVED IMPACT STRENGTH AND METHOD OF MANUFACTURING ABS-BASED INJECTION-MOLDED ARTICLE INCLUDING THE SAME

CROSS-REFERENCE TO RELATED APPLICATION

This application is a U.S. National Stage of PCT/KR2017/010647 filed Sep. 26, 2017, which claims the priority benefit of Korean Patent Application No. 10-2016-0144438, filed on Nov. 1, 2016, in the Korean Intellectual Property Office, the disclosures of which are incorporated herein by reference.

TECHNICAL FIELD

The present invention relates to a method of preparing an ABS-based graft copolymer having improved impact strength and an ABS-based injection-molded article including the same. More particularly, the present invention relates to a method of preparing an ABS-based graft copolymer capable of improving impact strength of an ABS-based resin by introducing a multimeric acid of an unsaturated fatty acid or a metal salt thereof as an emulsifier upon polymerization of a large-diameter diene-based rubber latex and preparation of an ABS-based graft copolymer, and an ABS-based injection-molded article including the same.

BACKGROUND ART

Since, in the case of an acrylonitrile-butadiene-styrene (ABS) copolymer resin, mechanical strength, such as impact resistance, and properties, such as moldability and gloss, are relatively satisfactory, it has been widely used in electric components, electronic components, office equipment, automobile components, and the like.

When an ABS copolymer resin is prepared by grafting an aromatic vinyl compound and a vinyl cyan compound monomer to a conjugated diene-based rubber latex in an emulsion polymerization method, the ABS copolymer resin generally exhibits advantages such as satisfactory property balance and superior gloss, compared to that prepared in a bulk polymerization method. Accordingly, an ABS copolymer resin is mainly prepared in an emulsion polymerization method.

In addition, when an ABS copolymer resin prepared by an emulsion polymerization method is mixed and processed with a styrene-acrylonitrile copolymer (SAN) and thus the properties of the SAN resin composition are maximally utilized, products can be varied and a high value can be created.

Meanwhile, impact strength of an ABS resin is affected by the structure or molecular weight of diene-based rubber latex particles, as seed particles, the molecular weight of an ABS shell, a structure between ABS particles and a SAN matrix, and the like. To improve impact strength of an ABS resin, a method of adjusting the concentration of an initiator, a reaction temperature, a molecular weight regulator, a monomer concentration, and the like was proposed.

However, since there is a limitation in improving impact strength of an ABS-based resin in the method of adjusting the concentrations of reactants or temperature, it is difficult to produce a product particularly requiring impact resistance by the method.

RELATED ART DOCUMENT

[Patent Document] (Patent Document 1) KR 0179314 B1

DISCLOSURE

Technical Problem

Therefore, the present invention has been made in view of the above problems, and it is one object of the present invention to provide a method of preparing an ABS-based graft copolymer capable of improving impact strength by affecting structures of polymer particles through introduction of a novel emulsifier including a multimeric acid of an unsaturated fatty acid or a metal salt thereof upon polymerization of a diene-based rubber latex and preparation of an ABS-based graft copolymer and further improving impact strength of a final ABS-based product by affecting a matrix structure between an ABS-based graft copolymer and a SAN resin, and a method of manufacturing an ABS-based injection-molded article including the ABS-based graft copolymer.

The above and other objects can be accomplished by the present disclosure described below.

Technical Solution

In accordance with one aspect of the present invention, provided is a method of preparing an ABS-based graft copolymer having improved impact strength, the method including a) a step of polymerizing 100 parts by weight of a conjugated diene-based monomer, 0.5 to 5 parts by weight of an emulsifier, and 0.01 to 6 parts by weight of a water-soluble polymerization initiator; b) a step of adding 0.01 to 5 parts by weight of an emulsifier thereto when a polymerization conversion rate is 60 to 85%, after step a); c) a step of terminating polymerization when a polymerization conversion rate is 90 to 99% to obtain a large-diameter diene-based rubber latex; and d) a step of graft-polymerizing 100 parts by weight of a monomer mixture including 40 to 70% by weight (based on solids) of the large-diameter diene-based rubber latex, 15 to 35% by weight of an aromatic vinyl monomer, and 5 to 25% by weight of a vinyl cyan monomer with 0.01 to 3 parts by weight of an emulsifier, 0.01 to 3 parts by weight of an initiator, and 0.001 to 1 part by weight of an oxidation-reduction catalyst, wherein the emulsifiers of steps a) and d) are a multimeric acid of an unsaturated fatty acid or a metal salt thereof.

In accordance with another aspect of the present invention, provided is a method of manufacturing an ABS-based injection-molded article, the method including a step of mixing and extruding 10 to 50% by weight of an ABS-based graft copolymer prepared according the method and 50 to 90% by weight of an aromatic vinyl monomer-vinyl cyan monomer copolymer, and then performing injection-molding.

Advantageous Effects

As apparent from the fore-going, by using a multimeric acid of an unsaturated fatty acid or a metal salt thereof as an emulsifier upon preparation of a large-diameter diene-based rubber latex and an ABS-based graft copolymer, the structure and properties of the large-diameter diene-based rubber latex particles, and interaction between the ABS-based copolymer resin including the multimeric acid of the unsaturated fatty acid or the metal salt thereof and a SAN resin may be optimized, whereby impact resistance of a final product may be improved.

BEST MODE

The present inventors confirmed that, when a multimeric acid of an unsaturated fatty acid or a metal salt thereof is applied as an emulsifier upon preparation of a large-diameter diene-based rubber latex and an ABS-based graft copolymer, impact strength of the ABS-based resin is improved. Based on this finding, research has been more intensively conducted, thus completing the present invention.

In the present invention, the novel emulsifier used upon polymerization of a large-diameter diene-based rubber latex and preparation of an ABS-based graft copolymer affects the structure of rubber latex particles affecting impact strength of an ABS-based resin and a structure between an ABS-based graft copolymer particles prepared from the rubber latex particles and a SAN matrix, thereby improving properties, such as impact strength, of a final ABS-based resin.

The method of preparing an ABS-based graft copolymer having improved impact strength of the present invention may include the following steps:

a) a step of polymerizing 100 parts by weight of a conjugated diene-based monomer, 0.5 to 5 parts by weight of an emulsifier, and 0.01 to 6 parts by weight of a water-soluble polymerization initiator;

b) a step of adding 0.01 to 5 parts by weight of an emulsifier thereto when a polymerization conversion rate is 60 to 85%, after step a);

c) a step of terminating polymerization when a polymerization conversion rate is 90 to 99% to obtain a large-diameter diene-based rubber latex; and d) a step of graft-polymerizing 100 parts by weight of a monomer mixture including 40 to 70% by weight (based on solids) of the large-diameter diene-based rubber latex, 15 to 35% by weight of an aromatic vinyl monomer, and 5 to 25% by weight of a vinyl cyan monomer with 0.01 to 3 parts by weight of an emulsifier, 0.01 to 3 parts by weight of an initiator, and 0.001 to 1 part by weight of an oxidation-reduction catalyst.

In the present disclosure, to find a polymerization conversion rate, 1.5 g of a prepared latex is dried for 15 minutes in a 150° C. hot air dryer and then a weight of the dried latex is measured to find a total solid content (TSG). The polymerization conversion rate may be calculated according to Mathematical Equation 1 below:

Polymerization conversion rate (%)=Total solid content (TSC)×(weight of added monomers and supplementary materials)/100−(weight of added supplementary materials except for monomers)  [Mathematical Equation 1]

The present invention is characterized by using a multimeric acid of an unsaturated fatty acid or a metal salt thereof as an emulsifier in steps a) and d) to improve impact resistance of an ABS-based resin.

The emulsifiers of steps a) and d) affect structures of rubber latex particles, and structure between ABS-based graft copolymer particles prepared from the rubber latex particles and a SAN matrix, thereby improving impact resistance of a final product.

In the present disclosure, the multimeric acid of the unsaturated fatty acid refers to a polyvalent carboxylic acid obtained by polymerizing two or more unsaturated fatty acids, and the unsaturated fatty acid is considered to include a straight-chain, branched-chain, cyclic, or complex cyclic unsaturated fatty acid or a derivative thereof.

In the present disclosure, the derivative refers to a compound, one or more hydrogen atoms of which are substituted with an alkyl group, a halogen group, or a hydroxyl group.

In the present disclosure, the complex cyclic unsaturated fatty acid refers to a compound including at least two saturated or unsaturated cycloalkyl groups having 5 to 15 carbon atoms.

In an embodiment, as the emulsifiers of steps a) and d), a straight-chain, branched-chain, or cyclic unsaturated fatty acid having 8 to 22 carbon atoms or a metal salt thereof may be used. Accordingly, structures of diene-based rubber latex particles and a structure between ABS-based graft copolymer particles and a SAN matrix are affected, thereby affecting increase in impact strength of an ABS-based resin.

In the present invention, as the emulsifier of each of steps a) and d), a dimer acid of an unsaturated fatty acid or a metal salt thereof may be used, whereby impact strength of an ABS-based resin may be improved.

In an embodiment, the emulsifier of each of steps a) and d) may be at least one dimer acid selected from the group consisting of compounds represented by Formulas 1 to 6 below or a metal salt thereof, whereby structures of diene-based rubber particles and a mixed composition including an ABS-based resin and a SAN-based resin are affected and thus impact strength of an ABS-based resin may be improved:

[Formula 1]
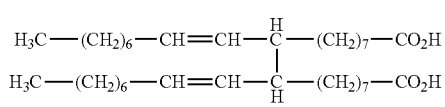

[Formula 2]
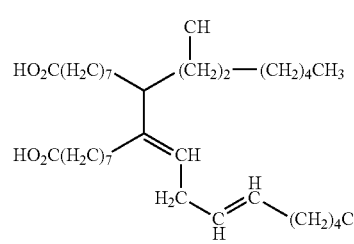

[Formula 3]
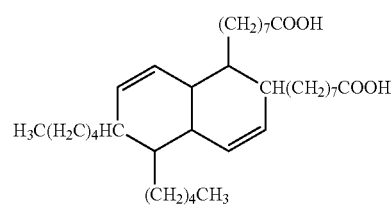

[Formula 4]
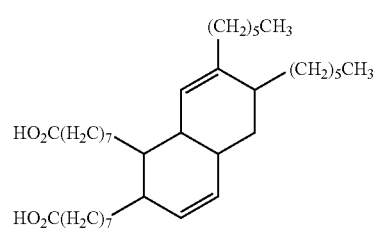

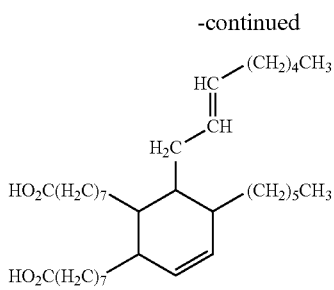

[Formula 5]

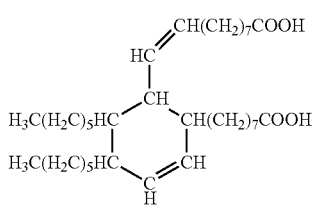

[Formula 6]

More particularly, the emulsifier of each of steps a) and d) may include a dimer acid derived from a compound selected from the group including 3-octenoic acid, 10-undecenoic acid, oleic acid, linoleic acid, elaidic acid, palmitoleic acid, linolenic acid, tall oil fatty acid as a mixture of unsaturated carboxylic acid, soybean oil fatty acid, palm oil fatty acid, tallow fatty acid, lard fatty acid, tallow fatty acid, rice bran oil fatty acid, and flaxseed oil fatty acid, or a metal salt thereof. However, these substances are merely provided as examples, and it should be noted that the present invention is not limited thereto.

In an embodiment, the emulsifiers of steps a) and d) may include an alkali metal salt or alkali earth metal salt of a multimeric acid of an unsaturated fatty acid, whereby impact resistance of an ABS-based resin may be improved.

The alkali metal salt may be, for example, a sodium salt or a potassium salt and the alkali earth metal salt may be, for example, a magnesium salt or a calcium salt, but it should be noted that the present invention is not limited thereto.

In an embodiment, the emulsifier of each of steps a) and d) may be an alkali metal salt of a multimeric acid prepared by adding a hydroxide of an alkali metal, such as NaOH or KOH, to the multimeric unsaturated fatty acid to substitute a hydrogen of carboxylic acid with an alkali metal.

In another embodiment, the emulsifier of each of steps a) and d) may be a compound prepared by adding a metal salt, such as a calcium salt or a magnesium salt, to the multimeric unsaturated fatty acid or the alkali metal salt thereof, but it should be noted that the present invention is not limited thereto.

Hereinafter, each step of a method of preparing an ABS-based graft copolymer having improved impact strength due to introduction of the novel emulsifier is described in detail.

a) Step of polymerizing conjugated diene-based monomer, emulsifier, and water-soluble polymerization initiator:

The conjugated diene-based monomer may include one or more compounds selected from the group consisting of 1,3-butadiene, isoprene, 2-chloro-1,3-butadiene, and chloroprene. It should be noted that derivatives of the compounds are also possible.

In the present disclosure, the expression "derivative" refers to a compound, one or more hydrogen atoms of which are substituted with an alkyl group, a halogen group, or a hydroxyl group.

The emulsifier of step a) may be the multimeric acid of the unsaturated fatty acid or the salt thereof described above.

The emulsifier is preferably used in an amount of 0.5 to 5 parts by weight, 0.8 to 4 parts by weight, 1.0 to 3 parts by weight, or 1.0 to 2 parts by weight based on 100 parts by weight of the conjugated diene-based monomer. Within this range, an emulsifier content remaining after polymerization is low while securing polymerization stability, and impact resistance of an ABS-based resin is improved.

In another embodiment of the present invention, the emulsifier of step a) may be mixed with 20 to 80% by weight, 30 to 70% by weight, 40 to 60% by weight, or 25 to 50% by weight of at least one secondary emulsifier selected from the group consisting of alkyl aryl sulfonate, alkali metal alkyl sulfate, sulfonated alkyl ester, and metal salts of unsaturated fatty acid based on 100% by weight of the emulsifier.

When the emulsifier is mixed with the secondary emulsifier in step a), a coagulum content in a latex prepared through polymerization is low and, ultimately, mechanical properties, such as impact strength, of an ABS-based injection-molded article manufactured from the ABS-based graft copolymer may be improved.

In the present invention, the water-soluble polymerization initiator may be, for example, one or more selected from the group consisting of potassium persulfate, sodium persulfate, and ammonium persulfate.

An amount of the water-soluble polymerization initiator used in step a) is preferably 0.01 to 6 parts by weight, 0.05 to 4 parts by weight, 0.1 to 2 parts by weight or 0.1 to 1 part by weight based on 100 parts by weight of the conjugated diene based monomer. Within this range, excessive reaction may be prevented and a large-diameter rubber latex having uniform size distribution may be produced. Accordingly, quality of an ABS-based molded article may be ultimately improved.

Step a) may include, as a particular example, a-1) a step of adding and polymerizing 45 to 90 parts by weight of 100 parts by weight of the conjugated diene-based monomer, 0.5 to 5 parts by weight of an emulsifier, and 0.01 to 3 parts by weight of a water-soluble polymerization initiator; and a-2), after step a-1), a step of adding 10 to 55 parts by weight of the conjugated diene-based monomer and 0.01 to 3 parts by weight of a water-soluble polymerization initiator thereto when a polymerization conversion rate is 25 to 55%.

In step a-1), the conjugated diene-based monomer is preferably first-added in an amount of 45 to 90 parts by weight, 55 to 90 parts by weight, 65 to 90 parts by weight, or 75 to 90 parts by weight based on 100 parts by weight of a total of used conjugated diene-based monomer. When the conjugated diene-based monomer is first-added within this range, the number of base particles formed at an initial reaction stage is appropriate and thus diameters of the particles may be enlarged in a short time. In addition, excessive reaction due to polymerization heat may be prevented and thus a large-diameter rubber latex having a uniform particle diameter may be prepared.

In addition, the water-soluble polymerization initiator in step a-1) is preferably used in an amount of 0.01 to 3 parts by weight based on 100 parts by weight of the conjugated diene-based monomer. Accordingly, a large-diameter rubber latex having a uniform particle diameter may be prepared and, ultimately, impact resistance of an ABS-based resin may be improved.

In step a-2), a remainder of the conjugated diene-based monomer or 10 to 55 parts by weight, 10 to 45 parts by weight, 10 to 35 parts by weight, or 10 to 25 parts by weight thereof is preferably second-added when a polymerization conversion rate is 25 to 55%, 30 to 50%, or 35 to 45%.

Within this range, a large-diameter rubber latex having a uniform size may be prepared in a short time.

In addition, preferably, the conjugated diene-based monomer added in step a-2) is continuously added from the addition time point until a conversion rate reaches 60 to 85%, 65 to 80%, or 70 to 80%. Accordingly, a content of unreacted monomers present in a reactant may be minimized, whereby side reactions may be prevented and a large-diameter rubber latex having a uniform size may be prepared.

In the present disclosure, the expression "continuously added" refers to continuous addition or dripping of a compound for reaction during a predetermined time or for 1 minute to 2 hours, 10 minutes to 1 hour, or 20 to 50 minutes without stopping of addition, or addition of a predetermined amount of the compound in 2 steps or more, 5 steps or more, or 5 to 20 steps.

In an embodiment, the expression "continuously added" in step a-2) may refer to split addition of the conjugated diene-based monomer used in step a-2) over 2 to 5 steps.

In another embodiment, the expression "continuously added" in step a-2) may refer to addition of the conjugated diene-based monomer used in step a-2) from a polymerization conversion rate of 25 to 55% to a polymerization conversion rate of 60 to 85% at a rate of 0.01 to 0.2 g/min.

In addition, the water-soluble polymerization initiator in step a-2) is preferably added in an amount of 0.01 to 3 parts by weight, 0.1 to 3 parts by weight, 0.1 to 2 parts by weight, or 0.1 to 1 part by weight. Within this range, a large-diameter rubber latex having a uniform average particle diameter may be prepared.

b) Step of adding 0.01 to 5 parts by weight of emulsifier when polymerization conversion rate is 60 to 85%:

The emulsifier of step b) may be one or more selected from the group consisting of an alkyl aryl sulfonate, an alkali metal alkyl sulfate, a sulfonated alkyl ester, and a metal salt of an unsaturated fatty acid.

In step b), the emulsifier is preferably added in an amount of 0.01 to 3 parts by weight, 0.1 to 3 parts by weight, 0.1 to 2 parts by weight, or 0.1 to 1 part by weight based on 100 parts by weight of the conjugated diene-based monomer, when a polymerization conversion rate is 60 to 85%, 65 to 80%, or 70 to 80%.

When the emulsifier of step b) is added within this range, polymerization stability is improved and thus a coagulum content in a latex is reduced. Accordingly, mechanical strength of a molded article manufactured from the ABS-based copolymer is improved.

c) Step of terminating polymerization when polymerization conversion rate is 90 to 99% to obtain large-diameter diene-based rubber latex:

Step c) is preferably terminated when a polymerization conversion rate is, for example, 90 to 99%, 93 to 99%, 95 to 99%, or 97 to 99%. Within this range, a polymerization degree is high and a large-diameter rubber latex having a uniform particle distribution may be prepared. Accordingly, quality of a resultant ABS-based resin may be ultimately improved.

A large-diameter diene-based rubber latex prepared according to the aforementioned steps preferably has an average particle diameter of 2700 to 3300 Å, or 2900 to 3200 Å because properties of an ABS-based resin greatly depend upon an average particle diameter of a diene-based rubber latex. In addition, an ABS-based resin prepared from a large-diameter diene-based rubber latex having an average particle diameter within this range has advantages such as superior impact strength and property balance.

In the present disclosure, an average particle diameter of a latex may be measured using a Nicomp 370HPL according to a dynamic laser light scattering method after mixing 1 g of a latex with 100 g of distilled water.

In addition, a coagulum content in the large-diameter diene-based rubbery latex prepared according to the steps may be 0.1% by weight or less, 0.08% by weight or less, or 0.05% by weight or less. An ABS-based resin prepared from a diene-based rubber latex having a coagulum content within this range has superior mechanical properties such as impact strength.

d) Step of graft-polymerizing aromatic vinyl monomer and vinyl cyan monomer to large-diameter diene-based rubber latex:

In step d), 100 parts by weight of a monomer mixture including the large-diameter diene-based rubber latex, an aromatic vinyl monomer, and a vinyl cyan monomer may be graft-polymerized with 0.01 to 3 parts by weight of an emulsifier, 0.01 to 3 parts by weight of an initiator, and 0.001 to 1 part by weight of an oxidation-reduction catalyst. Here, the emulsifier may be a multimeric acid of an unsaturated fatty acid or a metal salt thereof.

In an embodiment, the monomer mixture may include 40 to 70% by weight (based on solids) of the large-diameter diene-based rubber latex, 15 to 35% by weight of the aromatic vinyl monomer, and 5 to 25% by weight of the vinyl cyan monomer. An ABS-based copolymer prepared within this range exhibits superior mechanical properties and property balance.

In another embodiment, the monomer mixture may include 50 to 65% by weight (based on solids) of the large-diameter diene-based rubber latex, 20 to 35% by weight of the aromatic vinyl monomer, and 5 to 15% by weight of the vinyl cyan monomer. Within this range, a prepared ABS-based resin composition has superior mechanical properties and property balance.

In another embodiment, the monomer mixture may include 55 to 65% by weight (based on solids) of the large-diameter diene-based rubber latex, 25 to 35% by weight of the aromatic vinyl monomer, and 5 to 15% by weight of the vinyl cyan monomer. When an ABS-based resin is prepared using monomers mixed within this range, the ABS-based resin exhibits superior mechanical properties and satisfactory property balance.

The aromatic vinyl monomer may include one or more selected from the group consisting of styrene, α-methyl styrene, α-ethyl styrene, p-methyl styrene, o-t-butyl styrene, bromostyrene, chlorostyrene, trichlorostyrene, and derivatives thereof, but it should be noted that the present invention is not limited thereto.

The vinyl cyan monomer may include one or more selected from the group consisting of acrylonitrile, methacrylonitrile, and derivatives thereof, but the present invention is not limited thereto.

In the present disclosure, the expression "derivative" may refer to a compound, one or more hydrogen atoms of which are substituted with a halogen group, an alkyl group, or a hydroxyl group.

As the emulsifier of step d), the multimeric acid of the unsaturated fatty acid or the metal salt thereof described above is used. The emulsifier is preferably used in an amount of 0.01 to 3 parts by weight, 0.05 to 2 parts by weight, 0.1 to 1.5 parts by weight, or 0.3 to 1.0 parts by weight based on 100 parts by weight of the monomer mixture. Within this range, a coagulum content in a finally prepared ABS-based graft copolymer latex is low and impact resistance of a resultant ABS-based resin is improved.

The emulsifier of step d) may be mixed with 20 to 80% by weight, 30 to 70% by weight, 40 to 60% by weight or 25 to 50% by weight of at least one secondary emulsifier selected from the group consisting of an alkyl aryl sulfonate, an alkali metal alkyl sulfate, a sulfonated alkyl ester, and a metal salt of an unsaturated fatty acid based on 100 parts by weight of the emulsifier.

When, in step d), the secondary emulsifier is mixed within this range, a coagulum content in a prepared ABS-based graft copolymer latex is reduced and thus mechanical properties, such as impact strength, of a final ABS-based molded article may be improved.

The initiator of step d) may be a water-soluble initiator or a liposoluble initiator. The water-soluble initiator may be, for example, sodium persulfate, potassium persulfate, ammonium persulfate, or the like, and the liposoluble initiator may be, for example, cumene hydroperoxide, diisopropyl benzene hydroperoxide, tertiary butyl hydroperoxide, paramethane hydroperoxide, benzoyl peroxide, or the like. In addition, it should be noted that a mixture of the water-soluble initiator and the liposoluble initiator may be used as needed.

In step d), the initiator may be used in an amount of 0.01 to 3 parts by weight, 0.01 to 2 parts by weight, 0.01 to 1 part by weight, or 0.05 to 0.25 parts by weight based on 100 parts by weight of the monomer mixture. Within this range, a content of unreacted monomers is low and thus quality of a resultant ABS-based resin is improved.

In step d), the oxidation-reduction catalyst may include, for example, one or more selected from the group consisting of sodium formaldehyde sulfoxylate, sodium ethylene diamine tetraacetate, ferrous sulfate, dextrose, pyrrole sodium phosphate, and sodium sulfite.

In step d), the oxidation-reduction catalyst may be used in an amount of 0.001 to 1 part by weight, 0.01 to 0.5 parts by weight, or 0.1 to 0.25 parts by weight. Within this range, a content of unreacted monomers is reduced and thus properties of a resultant ABS-based polymer may be improved.

In a particular embodiment, step d) may include the following steps:

d-1) a first graft polymerization step of reacting 100 parts by weight of the monomer mixture with 0.01 to 3 parts by weight of an emulsifier, 0.01 to 2 parts by weight of an initiator, and 0.0001 to 0.4 parts by weight of an oxidation-reduction catalyst at 50 to 90° C. for 2 to 5 hours;

d-2) after the first graft polymerization step, a step of adding 0.01 to 1 part by weight of an initiator and an 0.001 to 0.6 parts by weight of oxidation-reduction catalyst thereto;

d-3) a second graft polymerization step of, after step d-2), elevating temperature up to 60 to 100° C. (higher than the reaction temperature in step d-1)) at a temperature elevation rate of 10 to 15° C./hour and allowing reaction; and d-4) a step of terminating the polymerization when a polymerization conversion rate is 90 to 99%.

In step d-1), the first graft polymerization of the monomer mixture is preferably performed using 0.01 to 2 parts by weight, 0.05 to 1 part by weight, or 0.05 to 0.5 parts by weight of the initiator and 0.001 to 0.4 parts by weight, 0.005 to 0.2 parts by weight, or 0.01 to 0.2 parts by weight of the oxidation-reduction catalyst. When the initiator and the oxidation-reduction catalyst are added for the first graft polymerization, excessive reaction does not occur, heat generation control is easy, and a polymer having a desired particle diameter and size distribution may be synthesized.

In step d-1), the first graft polymerization is preferably performed by first-adding the initiator and the oxidation-reduction catalyst and reacting the same at 50 to 90° C. or 60 to 80° C. for 2 to 5 hours or 3 to 4 hours because, within this range, the initiator is activated to initiate polymerization and heat is easily controlled. In addition, when temperature and reaction time are controlled within this range, a polymer having a uniform size distribution may be prepared.

In step d-2), the initiator is added in an amount of 0.01 to 1 part by weight, 0.01 to 0.5 parts by weight, or 0.01 to 0.1 parts by weight, and the oxidation-reduction catalyst is added in an amount of 0.001 to 0.6 parts by weight, 0.01 to 0.3 parts by weight, or 0.01 to 0.1 parts by weight. When the initiator and the oxidation-reduction catalyst are secondarily added within the ranges, the content of unreacted monomers is reduced, whereby quality and productivity of a resultant ABS-based resin may be improved.

In step d-3), the second graft polymerization is preferably performed by elevating temperature up to 60 to 100° C. or 70 to 90° C. at a temperature elevation rate of 10 to 15° C./hour or 10 to 13° C./hour, after the addition of step d-2). When a temperature of the reactants is elevated within this range, reaction of unreacted monomers is facilitated and thus a high conversion rate may be accomplished in a shorter time.

In step d-4), reaction is preferably terminated when a polymerization conversion rate is 90 to 99%, 92 to 99%, or 95 to 99%. Within this range, a content of unreacted monomers in a product is low and an ABS-based graft copolymer having a high polymerization degree may be prepared.

An ABS-based graft copolymer prepared according to the method preferably has a graft efficiency of 30 to 50%, 31 to 45%, or 32 to 40%. Within this range, a resultant ABS-based resin exhibits superior impact resistance, scratch resistance, and the like.

In the present disclosure, "graft efficiency" may be calculated according to Mathematical Equation 2 below after dissolving a prepared ABS-based graft copolymer powder in acetone:

Graft efficiency (%)=(Weight of resin grafted to rubber/weight of rubber)*100     [Mathematical Equation 2]

An ABS-based graft copolymer prepared according to the method preferably has a weight average molecular weight (Mw) of 50,000 to 120,000 g/mol, 70,000 to 100,000 g/mol, or 80,000 to 90,000 g/mol. Within this range, a finally prepared ABS-based molded article exhibits superior impact strength and fluidity, thereby improving processability and productivity of a resin.

In the present disclosure, "weight average molecular weight" may be measured using GPC after dissolving a prepared ABS-based polymer in THF.

Other conditions, such as reaction pressure, an electrolyte, and a molecular weight regulator, other than the aforementioned conditions, are not specifically limited so long as they are within a range of conditions generally practiced in the technical field to which the present invention pertains, and may be appropriately selected and carried out as needed.

An ABS-based graft copolymer latex prepared according to the present invention is produced in a powder form through general processes such as coagulation, washing, and drying. A resultant powder is mixed with a SAN resin, etc., extruded, and injection-molded, thereby being manufactured into an ABS-based injection-molded article.

A method of manufacturing an ABS-based injection-molded article of the present invention may include a step of mixing 10 to 50% by weight of the ABS-based graft copolymer with 50 to 90% by weight of an aromatic vinyl monomer-vinyl cyan monomer copolymer and extruding the same, followed by injection-molding the same. When an ABS-based injection-molded article is manufactured within this range, a resultant ABS-based injection-molded article exhibits advantages such as superior impact strength and satisfactory property balance.

In another embodiment, the method of manufacturing an ABS-based injection-molded article of the present invention may include a step of mixing 20 to 40% by weight of the ABS-based graft copolymer with 60 to 80% by weight of an aromatic vinyl monomer-vinyl cyan monomer copolymer and extruding the same, followed by injection-molding the same. When an ABS-based injection-molded article is manufactured within the range, a resultant ABS-based injection-molded article exhibits advantages such as superior impact strength and satisfactory property balance.

In another embodiment, the method of manufacturing an ABS-based injection-molded article of the present invention may include a step of mixing 25 to 30% by weight of the ABS-based graft copolymer with 70 to 75% by weight of an aromatic vinyl monomer-vinyl cyan monomer copolymer and extruding the same, followed by injection-molding the same. When an ABS-based injection-molded article is manufactured within the range, a resultant ABS-based injection-molded article exhibits advantages such as superior impact strength and satisfactory property balance.

The aromatic vinyl monomer-vinyl cyan monomer copolymer may be a copolymer of the aromatic vinyl monomer and the vinyl cyan monomer used in the method of preparing an ABS-based graft copolymer. For example, the aromatic vinyl monomer-vinyl cyan monomer copolymer may be a copolymer of a vinyl aromatic monomer, such as styrene or α-methyl styrene, and a vinyl cyan monomer, such as acrylonitrile, methacrylonitrile, or ethacrylonitrile.

The aromatic vinyl monomer-vinyl cyan monomer copolymer may be, for example, a copolymer of 50 to 80% by weight of an aromatic vinyl monomer and 20 to 50% by weight of a vinyl cyan monomer. As another example, the aromatic vinyl monomer-vinyl cyan monomer copolymer may be a copolymer of 65 to 80% by weight of an aromatic vinyl monomer and 20 to 35% by weight of a vinyl cyan monomer. Within this range, an ABS-based injection-molded article having desired mechanical characteristics may be manufactured.

The extrusion may be carried out, for example, at 200 to 240° C. and 140 to 190 rpm, or 200 to 220° C. and 150 to 180 rpm. Within this range, an ABS-based resin having desired mechanical characteristics may be prepared.

The injection-molding may be carried out, for example, under a condition of 200 to 230° C. and 70 to 90 bar, or 200 to 220° C. and 70 to 80 bar. Within this range, an ABS-based injection-molded article having desired mechanical characteristics may be manufactured.

In addition, an ABS-based injection-molded article prepared by the method of the present invention may have an Izod impact strength (¼") of 33 kg/cm$^2$ or more and an Izod impact strength (⅛") of 41 kg/cm$^2$ or more. Here, the Izod impact strength may be measured according to a standard measurement method, ASTM D-256.

With regard to the method of manufacturing an ABS-based injection-molded article described above, other conditions not particularly disclosed are not specifically limited so long as they are within a range of conditions generally performed in the technical field to which the present invention pertains, and may be appropriately selected as needed.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLES

Example 1

1. Preparation of Large-Diameter Diene-Based Rubber Latex 55 parts by weight of deionized water, 85 parts by weight of 100 parts by weight of 1,3-butadiene as a monomer, 1.5 parts by weight of potassium dimer acid salt (Cas No. 67701-19-3) as an emulsifier, 0.15 parts by weight of potassium carbonate ($K_2CO_3$) as an electrolyte, 0.3 parts by weight of tertiary dodecyl mercaptan (TDDM) as a molecular weight regulator, and 0.3 parts by weight of potassium persulfate as an initiator were fed batchwise into a polymerization reactor (autoclave) filled with nitrogen, and polymerization was performed at a reaction temperature of 70° C. until a polymerization conversion rate reached 35 to 45%.

Subsequently, 0.3 parts by weight of potassium persulfate were fed thereinto batchwise, and the remainder of 1,3-butadiene was continuously fed thereinto until a polymerization conversion rate reached 70 to 80%. Subsequently, 0.3 parts by weight of rosin acid soap were fed thereinto batchwise, and reaction was allowed to proceed. The reaction was terminated when a conversion rate reached 93%.

2. Preparation of ABS-Based Graft Copolymer 60 parts by weight of the large-diameter diene-based rubber latex (average particle diameter: 3200 Å, coagulum content: 0.04% by weight), 100 parts by weight of deionized water, a mixture of 10 parts by weight of acrylonitrile, 30 parts by weight of styrene, 25 parts by weight of deionized water, 0.12 parts by weight of t-butyl hydroperoxide, 0.7 parts by weight of potassium dimer acid salt (Cas No. 67701-19-3), and 0.35 parts by weight of tertiary dodecyl mercaptan mixed in a separate mixer, 0.054 parts by weight of dextrose, 0.004 parts by weight of sodium pyrophosphate, and 0.002 parts by weight of ferrous sulfate were fed into a polymerization reactor filled with nitrogen at 70° C. over a period of 3 hours.

After completion of the addition, 0.05 parts by weight of dextrose, 0.03 parts by weight of sodium pyrophosphate, 0.001 parts by weight of ferrous sulfate, and 0.05 parts by weight of t-butyl hydroperoxide were fed into the polymerization reactor batchwise and temperature was elevated up to 80° C. over a period of 1 hour, followed by terminating reaction. As a result, an ABS latex was prepared. Here, a polymerization conversion rate was 97%.

3. Manufacture of ABS-Based Injection-Molded Article

The prepared ABS-based graft copolymer latex was coagulated with an aqueous sulfuric acid solution, washed, and dried, thereby obtaining a powder. 27.5 parts by weight of the obtained powder and 72.5 parts by weight of a SAN (product name: 92HR, manufactured by LG chemistry, including 27% by weight of acrylonitrile and 73% by weight of styrene) were mixed in a mixture, and then pelletized by means of an extruder (extrusion temperature: 210° C., 160 rpm). Subsequently, a specimen for measuring properties was obtained by means of an injection machine (injection-molding temperature: 210° C., injection-molding pressure: 80 bar, Engel ES 200/45 HL-Pro Series).

Example 2

An experiment was carried out in the same manner as in Example 1, except that a mixture of potassium dimer acid salt and rosin acid soap mixed in a weight ratio of 50:50 was used instead of potassium dimer acid salt.

Example 3

An experiment was carried out in the same manner as in Example 1, except that a mixture of potassium dimer acid salt and C16 to C18 saponified fatty acid mixed in a weight ratio of 50:50 was used instead of potassium dimer acid salt.

Example 4

An experiment was carried out in the same manner as in Example 1, except that a mixture of potassium dimer acid salt, rosin acid soap, and C16 to C18 saponified fatty acid mixed in a weight ratio of 50:25:25 was used instead of potassium dimer acid salt.

Comparative Example 1

An experiment was carried out in the same manner as in Example 1, except that C16 to C18 saponified fatty acid was used instead of potassium dimer acid salt.

TEST EXAMPLES

Properties of a sample prepared in each of the examples and the comparative example were measured according to the following methods. Results are summarized in Table 1 below.

Weight Average Molecular Weight

The prepared ABS-based resin was dissolved in THF, and a weight average molecular weight thereof was measured using GPC.

Graft Efficiency

The prepared ABS-based graft copolymer powder was dissolved in acetone, and a graft efficiency thereof was calculated according to Mathematical Equation 2 below:

Graft efficiency (%)=(Weight of resin grafted to rubber/weight of rubber)*100 [Mathematical Equation 2]

Izod Impact Strength

Specimens respectively having thicknesses of ¼" and ⅛" were used, and Izod impact strength thereof was measured according to ASTM D-256.

TABLE 1

| | Example 1 | Example 2 | Example 3 | Example 4 | Comparative Example 1 |
|---|---|---|---|---|---|
| Impact strength (¼") [kg/cm²] | 37.1 | 35.0 | 34.1 | 33.4 | 32.9 |
| Impact strength (⅛") [kg/cm²] | 47.8 | 44.1 | 44.0 | 42.9 | 40.3 |

TABLE 1-continued

| | Example 1 | Example 2 | Example 3 | Example 4 | Comparative Example 1 |
|---|---|---|---|---|---|
| Weight average molecular weight [g/mol] | 71,809 | 73,587 | 65,435 | 77,832 | 84,274 |
| Graft efficiency [%] | 35.0 | 33.9 | 32.1 | 31.9 | 31.6 |

As shown in Table 1, it can be confirmed that, in the cases of Examples 1 to 4 in which potassium dimer acid salt was used as the emulsifier in the diene-based rubber latex polymerization step and the ABS-based graft polymerization step, impact strength is high, compared to Comparative Example 1 in which potassium dimer acid salt was not included.

In addition, it can be confirmed that the ABS-based copolymers according to the present invention exhibit a low weight average molecular weight and high graft efficiency, compared to the copolymer according to Comparative Example 1.

The invention claimed is:
1. A method of preparing a resin including an ABS-based graft copolymer having improved impact strength, the method comprising:
   mixing and extruding 10 to 50% by weight of the ABS-based graft copolymer and 50 to 90% by weight of an aromatic vinyl monomer-vinyl cyan monomer copolymer,
   wherein the resin including the ABS-based graft copolymer has an Izod impact strength (1/4") of 33 kg/cm² or more and an Izod impact strength (1/8") of 41 kg/cm² or more when tested according to ASTM D-256, and
   wherein the ABS-based graft copolymer was prepared by:
   a) a step of polymerizing 100 parts by weight of a conjugated diene-based monomer, 0.5 to 5 parts by weight of an emulsifier, and 0.01 to 6 parts by weight of a water-soluble polymerization initiator;
   b) a step of adding 0.01 to 5 parts by weight of an emulsifier thereto when a polymerization conversion rate is 60 to 85%, after step a);
   c) a step of terminating polymerization when a polymerization conversion rate is 90 to 99% to obtain a large-diameter diene-based rubber latex; and
   d) a step of graft-polymerizing 100 parts by weight of a monomer mixture comprising 40 to 70% by weight (based on solids) of the large-diameter diene-based rubber latex, 15 to 35% by weight of an aromatic vinyl monomer, and 5 to 25% by weight of a vinyl cyan monomer with 0.01 to 3 parts by weight of an emulsifier, 0.01 to 3 parts by weight of an initiator, and 0.001 to 1 part by weight of an oxidation-reduction catalyst,
   wherein the emulsifiers of steps a) and d) are a multimeric acid of an unsaturated fatty acid or a metal salt thereof.
2. The method according to claim 1, wherein the unsaturated fatty acid is a straight-chain, branched-chain, or cyclic unsaturated fatty acid having 8 to 22 carbon atoms.
3. The method according to claim 1, wherein the multimeric acid is a dimer acid.
4. The method according to claim 3, wherein the dimer acid is one or more selected from the group consisting of compounds represented by Formulas 1 and 3 to 6 below:

[Formula 1]
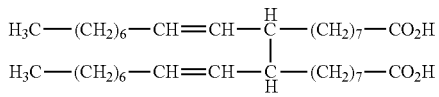

[Formula 3]
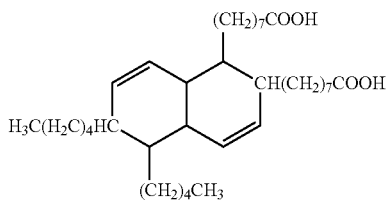

[Formula 4]
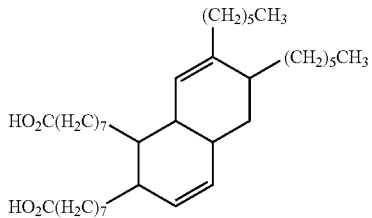

[Formula 5]
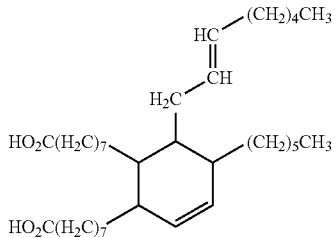

[Formula 6]
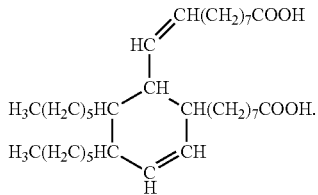

5. The method according to claim 1, wherein the metal salt is an alkali metal salt or an alkali earth metal salt.

6. The method according to claim 5, wherein the alkali metal salt is a sodium salt or a potassium salt.

7. The method according to claim 5, wherein the alkali earth metal salt is a magnesium salt or a calcium salt.

8. The method according to claim 1, wherein the emulsifier of step a) or d) further comprises 20 to 80% by weight of at least one secondary emulsifier selected from the group consisting of alkyl aryl sulfonate, alkali metal alkyl sulfate, sulfonated alkyl ester, and metal salts of unsaturated fatty acid based on 100 parts by weight of the emulsifier.

9. The method according to claim 1, wherein step a) comprises a-1) a step of adding and polymerizing 45 to 90 parts by weight of 100 parts by weight of the conjugated diene-based monomer, 0.5 to 5 parts by weight of an emulsifier, and 0.01 to 3 parts by weight of a water-soluble polymerization initiator; and a-2), after step a-1), a step of adding 10 to 55 parts by weight of the conjugated diene-based monomer and 0.01 to 3 parts by weight of a water-soluble polymerization initiator thereto when a polymerization conversion rate is 25 to 55%.

10. The method according to claim 9, wherein, in step a-2), 10 to 55 parts by weight of the conjugated diene-based monomer is continuously added until a polymerization conversion rate reaches 60 to 85%.

11. The method according to claim 1, wherein the large-diameter diene-based rubber latex has an average particle diameter of 2700 to 3300 Å and a coagulum content of 0.1% by weight or less.

12. The method according to claim 1, wherein step d) comprises d-1) a first graft polymerization step of reacting 100 parts by weight of the monomer mixture with 0.01 to 3 parts by weight of an emulsifier, 0.01 to 2 parts by weight of an initiator, and 0.0001 to 0.4 parts by weight of an oxidation-reduction catalyst at 50 to 90° C. for 2 to 5 hours;
   d-2) after the first graft polymerization step, a step of adding 0.01 to 1 part by weight of an initiator and an 0.001 to 0.6 parts by weight of oxidation-reduction catalyst thereto;
   d-3) a second graft polymerization step of, after step d-2), elevating temperature up to 60 to 100° C. (higher than the reaction temperature in step d-1)) at a temperature elevation rate of 10 to 15° C/hour and allowing reaction to proceed; and
   d-4) a step of terminating the polymerization when a polymerization conversion rate is 90 to 99%.

13. The method according to claim 1, wherein an ABS-based graft copolymer prepared according to the method has a graft efficiency of 30 to 50%.

14. The method according to claim 1, wherein an ABS-based graft copolymer prepared according to the method has a weight average molecular weight (Mw) of 50,000 to 120,000 g/mol.

* * * * *